US010599367B2

(12) United States Patent
Delaney et al.

(10) Patent No.: US 10,599,367 B2
(45) Date of Patent: *Mar. 24, 2020

(54) UPDATING STORAGE MIGRATION RATES

(71) Applicant: International Business Machines Corporation, Armonk, NY (US)

(72) Inventors: John V. Delaney, Kildalkey (IE); Anthony M. Hunt, Hopewell Junction, NY (US); Maeve M. O'Reilly, Rathdrum (IE); Daniel P. Toulan, Leland, NC (US); Clea A. Zolotow, Key West, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,587

(22) Filed: Jun. 4, 2019

(65) Prior Publication Data
US 2019/0286332 A1 Sep. 19, 2019

Related U.S. Application Data

(63) Continuation of application No. 15/191,609, filed on Jun. 24, 2016, now Pat. No. 10,331,383.

(51) Int. Cl.
*G06F 12/00* (2006.01)
*G06F 3/06* (2006.01)
(52) U.S. Cl.
CPC ............. *G06F 3/067* (2013.01); *G06F 3/061* (2013.01); *G06F 3/0647* (2013.01)
(58) Field of Classification Search
None
See application file for complete search history.

(56) References Cited

U.S. PATENT DOCUMENTS

| | | | |
|---|---|---|---|
| 8,515,919 B1 ‡ | 8/2013 | Patwardhan | G06F 16/119 707/68 |
| 8,661,067 B2 ‡ | 2/2014 | Lehr | G06F 3/0613 707/74 |

(Continued)

FOREIGN PATENT DOCUMENTS

| WO | 2013110965 A1 | 8/2013 |
|---|---|---|
| WO | 2013110966 A1 | 8/2013 |

(Continued)

OTHER PUBLICATIONS

Delaney, et al., "Updating Storage Migration Rates", U.S. Appl. No. 15/191,609, filed Jun. 24, 2016.‡

(Continued)

*Primary Examiner* — Baboucarr Faal
(74) *Attorney, Agent, or Firm* — Daniel Simek

(57) ABSTRACT

A computer-implemented method includes identifying a storage migration. The storage migration is associated with a storage area network. The storage migration has a storage migration rate associated therewith. The method includes identifying an input/output throughput. The input/output throughput is associated with the storage area network. The input/output throughput stores a throughput rate for the storage area network. The method includes identifying a service level agreement rate for the input/output throughput. The method includes identifying a non-essential workload. The non-essential workload stores a non-essential workload rate associated therewith. The non-essential workload includes that portion of said input/output throughput that is for one or more background processes. The method includes determining an analyzed rate based on the throughput rate, the service level agreement rate, and the non-essential workload rate. The method includes updating the storage migration rate based on the analyzed rate.

20 Claims, 3 Drawing Sheets

(56) References Cited

U.S. PATENT DOCUMENTS

| | | | |
|---|---|---|---|
| 2006/0129771 A1 ‡ | 6/2006 | Dasgupta | G06F 3/0605 711/16 |
| 2008/0155218 A1 ‡ | 6/2008 | Elliott | G06F 11/1658 711/16 |
| 2012/0096053 A1 ‡ | 4/2012 | Lehr | G06F 3/0613 707/80 |
| 2013/0085742 A1 ‡ | 4/2013 | Barker | G06F 9/5088 703/22 |
| 2013/0085998 A1 ‡ | 4/2013 | Barker | G06F 9/5088 707/64 |
| 2014/0130055 A1 ‡ | 5/2014 | Guha | G06F 3/0604 718/10 |
| 2017/0041244 A1 ‡ | 2/2017 | Conner | G06F 3/067 |

FOREIGN PATENT DOCUMENTS

| | | | |
|---|---|---|---|
| WO | WO-2013110965 A1 ‡ | 8/2013 | |
| WO | WO-2013110966 A1 ‡ | 8/2013 | |
| WO | 2015015297 A3 | 2/2015 | |
| WO | WO-2015015297 A3 ‡ | 2/2015 | |

OTHER PUBLICATIONS

List of IBM Patents or Patent Applications Treated as Related, Appendix P, Filed Herewith, 2 pages.‡

Hacking et al., "Improving the Live Migration Process of Large Enterprise Applications", VTDC'09, Jun. 15, 2009, Barcelona, Spain, pp. 51-58, Copyright 2009 ACM, 978-1-60558-580-2/09/06.‡

"Enforcing Service Level Agreements using WebSphere DataPower, Part 1: Applying the SLA Control File pattern",IBM developerWorks, Aug. 2013 (First published Apr. 4, 2012), 41 pages, retrieved on Mar. 18, 2016.‡

Tai et al., "Live Data Migration for Reducing SLA Violations in Multi-tiered Storage Systems", 2014 IEEE International Conference on Cloud Engineering, pp. 361-366, 978-1-4799-3766-0/14, © 2014 IEEE, DOI 10.1109/IC2E.2014.8.‡

Gokhale et al., "Decreasing SLA Violations through Migration Reduction in Cloud Computing", International Journal of Researchers, Scientists and Developers, vol. 2, No. 2, Apr. 2014, ISSN: 2347-3469, pp. 31-35.‡

Goudarzi et al., "SLA-based Optimization of Power and Migration Cost in Cloud Computing", 2012 12th IEEE/ACM International Symposium on Cluster, Cloud and Grid Computing, pp. 172-179, 978-0-7695-4691-9/12.‡

Das et al., "Faster and Efficient VM Migrations for Improving SLA and ROI in Cloud Infrastructures", pp. 1-7, retrieved on Mar. 24, 2016.‡

Delaney, et al., "Updating Storage Migration Rates", U.S. Appl. No. 15/727,747, filed Oct. 9, 2017.‡

U.S. Appl. No. 16/430,587, filed Jun. 4, 2019.‡

U.S. Appl. No. 16/388,981, filed Apr. 19, 2019.‡

"Enforcing Service Level Agreements using WebSphere DataPower, Part 1: Applying the SLA Control File pattern", IBM developerWorks, Aug. 2013 (First published Apr. 4, 2012), 41 pages, retrieved on Mar. 18, 2016, >http://www.ibm.com/developerworks/websphere/library/techarticles/1204_dearmas/1204_dearmas.html>.

Das et al., "Faster and Efficient VM Migrations for Improving SLA and ROI in Cloud Infrastructures", pp. 1-7, retrieved on Mar. 24, 2016, <http://www.google.ie/url?sa=t&rct=j&q=&esrc=s&source=web&cd=4&ved=0CEAQFjAD&url=http%3A%2F%2Fwww.itc22.com%2Ffileadmin%2FITC22_files%2FMellanox_Efficient_VM_Migrations_for_Cloud_SLA_ROI_DC_CAVES_ieee_format.pdf&ei=rCgdVY7mD4OAU5nkgZgl&usg=AFQjCNG6bilpzjmgO-Ey7n7D4JvOGjM6sA&bvm=bv.89744112,d.Gg&cad=rja.

Gokhale et al., "Decreasing SLA Violations through Migration Reduction in Cloud Computing", International Journal of Researchers, Scientists and Developers, vol. 2, No. 2, Apr. 2014, ISSN: 2347-3649, pp. 31-35.

Goudarzi et al., "SLA-based Optimization of Power and Migration Cost in Cloud Computing", 2012 12th IEEE/ACM International Symposium on Cluster, Cloud and Grid Computing, pp. 172-179, 978-0-7695-4691-9/12, © 2012 IEEE, DOI 10.1109/CCGrid.2012.112.

List of IBM Patents or Patent Applications Treated as Related, Appendix P, Filed Herewith, 2 pps.

U.S. Appl. No. 15/191,609, filed Jun. 26, 2016.

U.S. Appl. No. 15/727,747, filed Oct. 9, 2017.

‡ imported from a related application

UPDATING STORAGE MIGRATION RATES

BACKGROUND

The present invention relates generally to the field of storage area networks and more particularly to storage migration rates.

A storage area network provides access to consolidated, block level data storage. A storage area network may copy, transfer, or migrate the block data storage from one system to another at a storage migration rate. With virtual machine storage migration, storage may be moved from one location to another without interrupting the workload of the virtual machine, if the virtual machine is running.

SUMMARY

A computer-implemented method includes identifying a storage migration. The storage migration is associated with a storage area network. The storage migration has a storage migration rate associated therewith. The method includes identifying an input/output throughput. The input/output throughput is associated with the storage area network. The input/output throughput stores a throughput rate for the storage area network. The method includes identifying a service level agreement rate for the input/output throughput. The method includes identifying a non-essential workload. The non-essential workload stores a non-essential workload rate associated therewith. The non-essential workload includes that portion of said input/output throughput that is for one or more background processes. The method includes determining an analyzed rate based on the throughput rate, the service level agreement rate, and the non-essential workload rate. The method includes updating the storage migration rate based on the analyzed rate. A corresponding computer program product and computer system are also disclosed.

DETAILED DESCRIPTION

Figure 1:
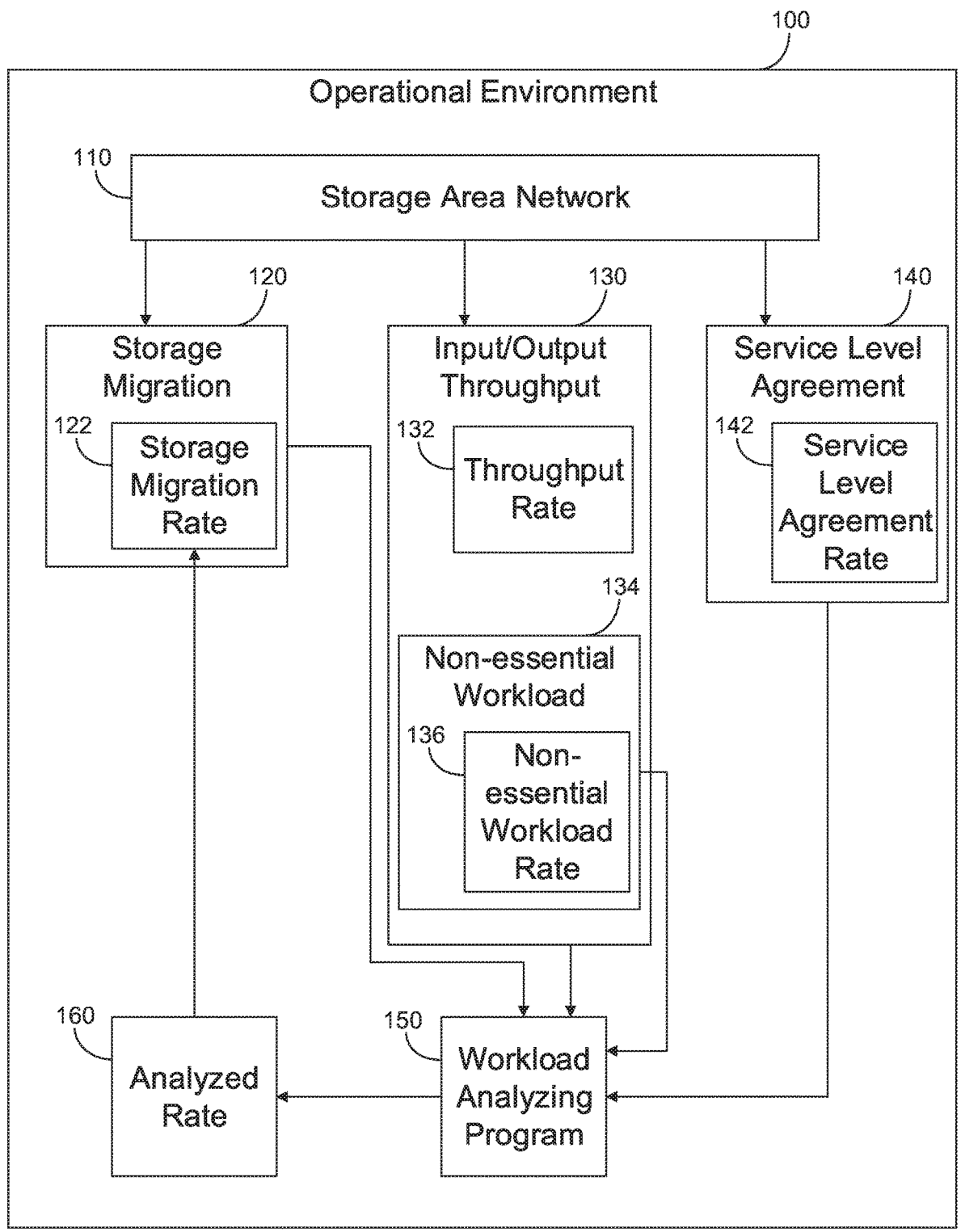
FIG. 1 is a block diagram of an operational environment suitable for operation of a workload analyzing program, in accordance with at least one embodiment of the present invention.

Referring now to the invention in more detail, FIG. 1 is a block diagram displaying an exemplary operational environment suitable for operation of at least one embodiment of the invention. An operational environment 100 includes a storage area network 110, a storage migration 120, which includes a storage migration rate 122, an input/output throughput 130, which includes a throughput rate 132 and a non-essential workload 134, which includes a non-essential workload rate 136, a service level agreement 140, which includes a service level agreement rate 142, a workload analyzing program 150, and an analyzed rate 160, all in mutual communication and interconnected via the operational environment 100. The operational environment 100 may be a cloud-based, virtual, or distributed environment or a remote environment on defined server hardware, or, more generally, the operational environment 100 may be any type of environment suitable for access by the storage area network 110 of the workload analyzing program 150.

The storage area network 110 may be a network which provides access to consolidated, block level data storage. The storage area network 110 may function to enhance storage devices, such disk arrays, tape libraries, and optical jukeboxes, accessible to servers so that the devices appear to the operating system as locally attached devices. The storage migration 120, the input/output throughput 130, and the service level agreement 140 are associated with the storage area network 110.

The storage migration 120 may be a process of transferring data between storage types, formats or computer systems. The storage migration 120 may be a module that tracks, monitors, and/or stores the storage migration rate 122. The storage migration 120 may be transferring data within the storage area network 110, to the storage area network 110, or from the storage area network 110. The storage migration 120 is associated with the storage migration rate 122. The storage migration rate 122 may be a measure of the amount of data transferred pre a unit of time, such as bytes per minute. The storage migration rate 122 may be understood as characterizing the speed of the storage migration 120. The storage migration rate 122 may be a number of steps, such as steps necessary to complete migration, per unit of time.

The input/output throughput 130 may be a parameter of transferring data of a disk in a system, such as the storage area network 110 that is associated with the storage migration 120. The input/output throughput 130 may be a module that tracks, monitors, and/or stores the throughput rate 132. The input/output throughput 130 may be a parameter of sending and receiving data within the storage area network 110 and/or within the operational environment 100. The input/output throughput 130 may characterize the data being transferred. For example, a portion of the data being transferred may be the non-essential workload 134. The input/output throughput 130 is associated with the throughput rate 132. The throughput rate 132 may be a measure of the amount of data transferred pre a unit of time, such as bytes per minute. The throughput rate 132 may be understood as characterizing the speed of the input/output throughput 130. The throughput rate 132 may be a number of steps, such as steps necessary to complete migration, per unit of time.

The non-essential workload 134 may be understood as a portion of the input/output throughput 130. The non-essential workload 134 may be a process of transferring data of a disk in a system, the data and/or transferring of the data being non-essential to the operation of the storage area network 110, the storage migration 120, or another system. Whether a portion of the input/output throughput 130 is the non-essential workload 134 may be determined by a user or predetermined by a user or user-created algorithm. The non-essential workload 134 may be a test of development workload that is programmed to run for a long time. For example, the non-essential workload 134 may be a non-business workload, such as a tape backup. The non-essential workload 134 may be production workload that is not time-sensitive. That is, the non-essential workload 134 may be capable of halting and re-starting at another time, such as a non-critical batch workload, with little to no impact. The non-essential workload 134 is associated with the non-essential workload rate 136. The non-essential workload rate 136 may be a measure of the amount of data transferred pre a unit of time, such as bytes per minute. The non-essential workload rate 136 may be understood as characterizing the speed of the non-essential workload 134. The non-essential workload rate 136 may be a number of steps, such as steps necessary to complete migration, per unit of time.

The service level agreement 140 may be a part of a standard service contract where a service is formally defined. The service level agreement 140 may define particular aspects of the service, such as scope, quality, and responsibilities. For example, the service level agreement 140 may be a contracted delivery time for the service or performance, such as defining the mean time between failures, the mean time to repair, or the mean time to recovery. The service level agreement 140 may be a module that tracks, monitors, and/or stores the service level agreement rate 142. The service level agreement 140 is associated with the service level agreement rate 142. The service level agreement rate 142 may be a measure of the amount of data transferred pre a unit of time, such as bytes per minute. The service level agreement rate 142 may be understood as characterizing the service level agreement 140. The service level agreement rate 142 may be a number of steps, such as steps necessary to complete migration, per unit of time. The service level agreement 140 may be structured with variables that categorize the nature of the service level agreement 140. The service level agreement rate 142 may be such a variable.

The workload analyzing program 150 is capable of identifying the storage migration 120, the input/output throughout 130, the service level agreement 140, and the non-essential workload 134 to generate the analyzed rate 160. In some embodiments, the workload analyzing program 150 is an analytics engine. In some embodiments, the analytics engine is IBM® Watson®. In some embodiments, the analytics engine may provide pattern matching capabilities. In some embodiments, the analytics engine may provide unobserved feature discovery capabilities. In some embodiments, the analytics engine may include machine learning models. The analyzed rate 160 is a rate similar to the storage migration rate 122, the throughput rate 132, the non-essential workload rate 136, and/or the service level agreement rate 142. The workload analyzing program 150 may return the analyzed rate 160 to the storage migration 120. The workload analyzing program 150 is able to update the storage migration rate 122 via the analyzed rate 160. The analyzed rate 160 may be instructions capable of being understood by the storage migration 120.

Figure 2:
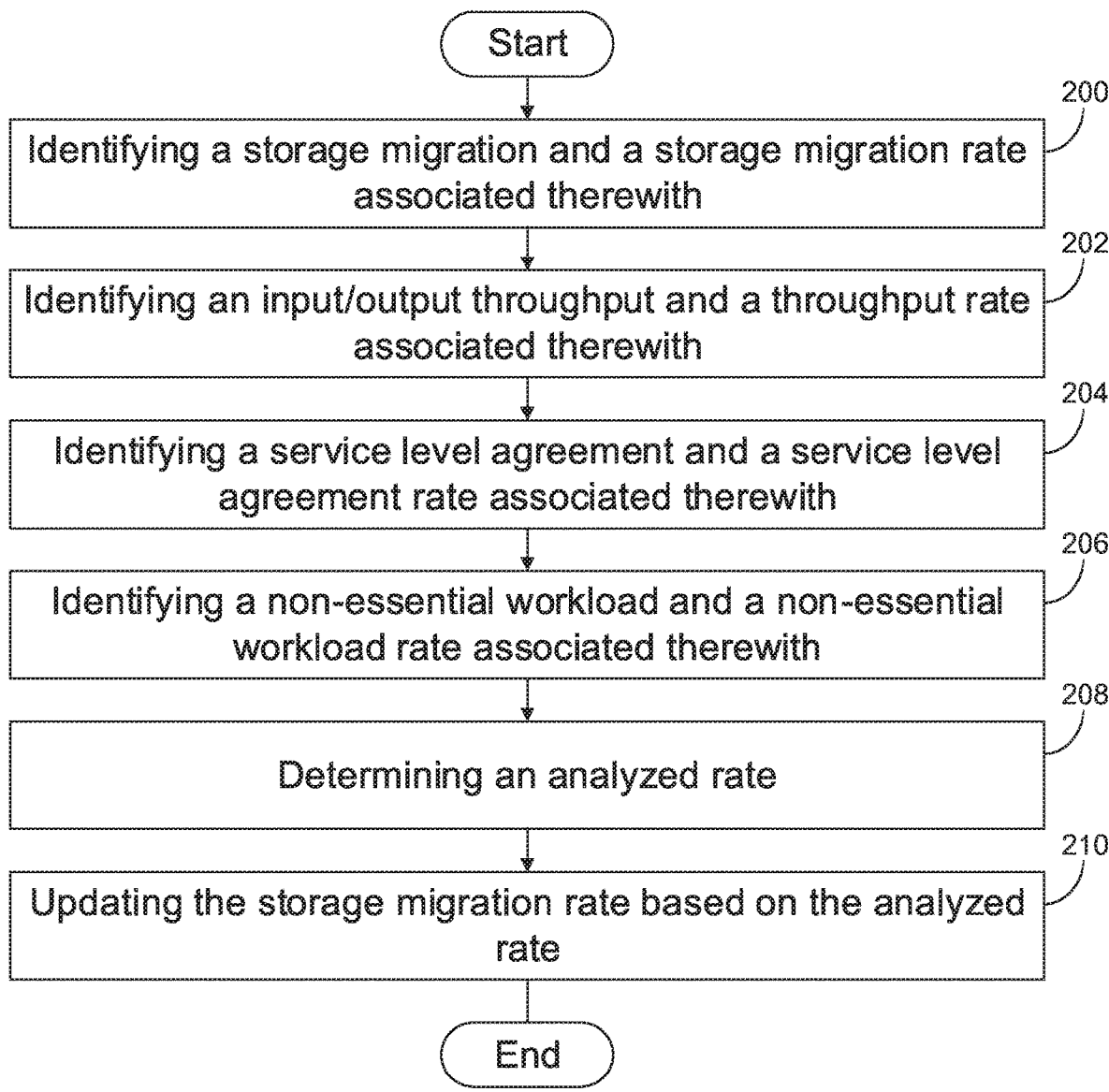
FIG. 2 is a flowchart depicting operational steps for a workload analyzing program, in accordance with at least one embodiment of the present invention.

FIG. 2 is a flowchart depicting the operational steps of the workload analyzing program 150, executing within the operational environment 100 of FIG. 1, in accordance with an embodiment of the present invention.

At step 200, the workload analyzing program 150 identifies the storage migration 120, which is associated with the storage migration rate 122 and the storage area network 110. Identifying may include a user explicitly calling the workload analyzing program 150 from a command line interface using a reference to the storage migration 120 as an argument. Alternatively, receiving may include automated calls to the workload analyzing program 150, for example, from an integrated development environment or as part of a workload analyzing management system At step 202, the workload analyzing program 150 identifies the input/output throughput 130, which is associated with the throughput rate 132. The input/output throughput 130 may store the throughput rate 132 for the storage area network 110.

At step 204, the workload analyzing program 150 identifies the service level agreement 140, which is associated with the service level agreement rate 142. In some embodiments, the service level agreement rate 142 is a structured variable stored, monitored, and/or tracked as an object, table, array, or other data structure, by the service level agreement 140. The service level agreement 140 may include information from a contract written in plain language that has been coded into a structured representation of the contract.

At step 206, the workload analyzing program 150 identifies the non-essential workload 134, which is associated with the non-essential workload rate 136. The non-essential workload 134 may store the non-essential workload rate 136. The non-essential workload 134 may be understood as a portion of the input/output throughput 132 that is for a background process, daemons, and local servers. Such non-essential workload tasks can include backups, memory management, garbage collection, hardware diagnostics, virus scans, and update checks.

At step 208, the workload analyzing program 150 determines the analyzed rate 160. Determining the analyzed rate 160 may include collecting data about the storage migration rate 122 such as conditions that may impact the speed of the storage migration rate 122. For example, determining the analyzed rate 160 may include collecting timestamp data associated with the storage migration rate 122 and determining a time period during which the storage migration rate 122 is fastest. Determining the analyzed rate 160 may include determining if decreasing the non-essential workload 134 would conflict with the service level agreement 140. The workload analyzing program 150 may analyze the throughput rate 132, the service level agreement rate 142, and the non-essential workload rate 136 to determine the analyzed rate 160. The workload analyzing program 150 may analyze the throughput rate 132, the service level agreement rate 142, and the non-essential workload rate 136 using predictive analytics, such as a normal autoregressive integrated moving average model. Predictive analytics is a type of data mining that uses past trends and current parameters to predict future trends and future trend probabilities. For example, predictive analytics may look at current network connectivity parameters, past throughput rates, past service level agreement rates, and past non-essential workload rates, to predict how a storage migration rate will be affected by, for example, removing a subset of non-essential workload from the throughput.

In other embodiments, the workload analyzing program 150 determining the analyzed rate 160 may include generated an analytics profile. The analytics profile may be the result of analyzing the throughput rate 132, the service level agreement rate 142, and the non-essential workload rate 136 via an analytics engine such as the workload analyzing program 150 and/or IBM® Watson®. The workload analyzing program 150 may update the storage migration rate 122 based on the analytics profile. The analytics profile may be a profile for storing analyzed data and raw data, such that trends, patterns, and other analyses of the throughput rate 132, the service level agreement rate 142, and the non-essential workload rate 136 may be determined. The workload analyzing program 150 may update information, trends, patterns, and other analyses stored within the analytics profile as more data is collected and analyzed. The analytics profile may store variables associated with previous rates such as previous throughput rates, service level agreement rates, non-essential workload rates, and analyzed rates. The analytics profile may store variables associated with previous input/output throughput, service level agreements, and non-essential workloads.

At step 210, the workload analyzing program 150 updates the storage migration rate 122 based on the analyzed rate 160 that was determined at step 208. In some embodiments, updating the storage migration rate 122 based on the analyzed rate 160 includes instructions to reduce the non-essential workload rate 136. In some embodiments, updating the storage migration rate 122 includes updating a priority level associated with the storage migration 120. For example, the storage migration 120 may have a priority level indicating it may run as a background process or when other programs are otherwise on standby. In such an embodiment, the workload analyzing program 150 may increase the priority level of the storage migration 120. In some embodiments, updating the storage migration rate 122 based on the analyzed rate 160 includes reducing the non-essential workload rate 136. Updating the storage migration 120 may be based on whether or not an update to the storage migration 120 would affect the service level agreement 140, and the extent to which the service level agreement 140 would be effected, as determined while determining the analyzed rate 160 at step 208.

Figure 3:
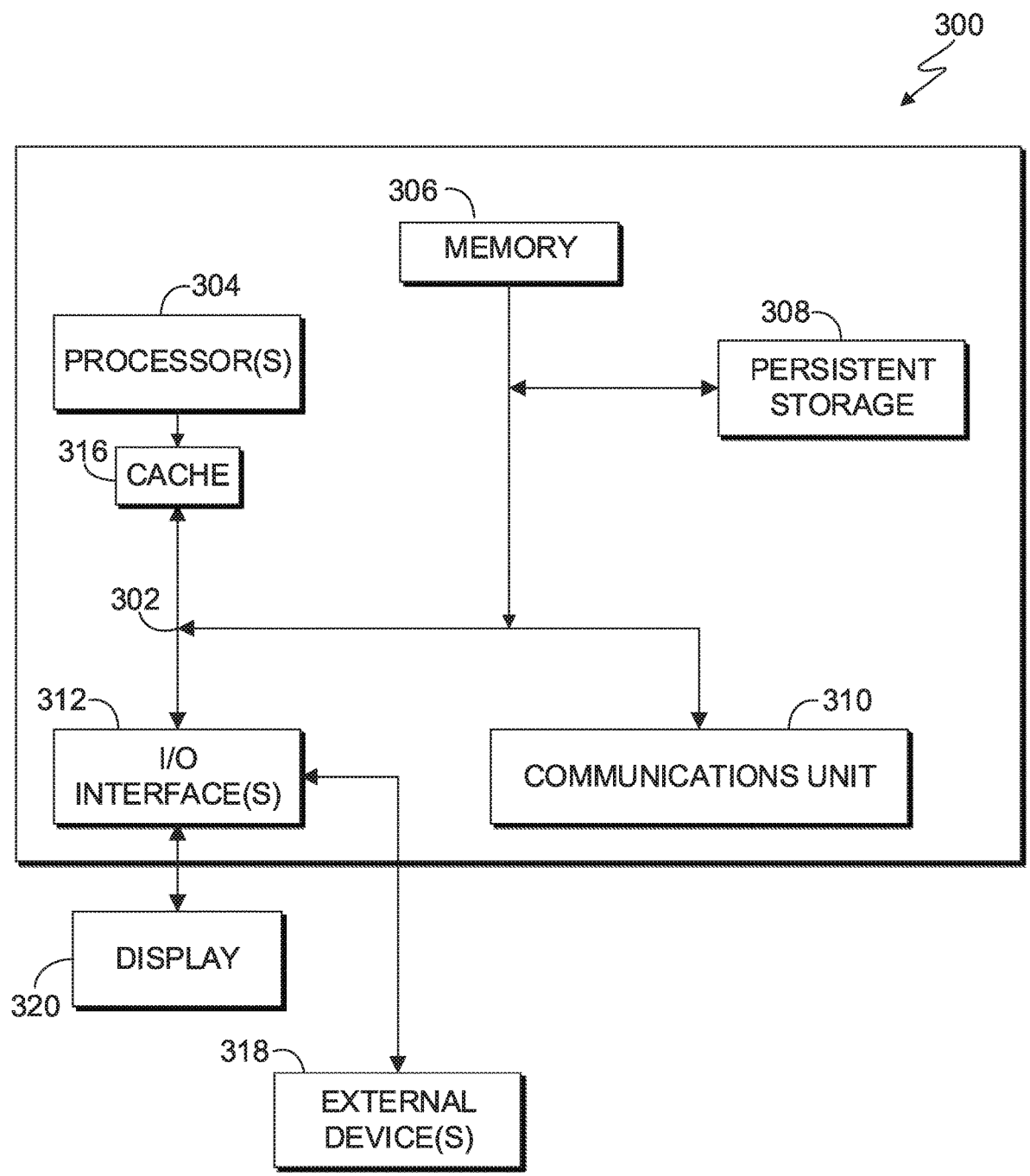
FIG. 3 is a block diagram of components of an operational apparatus suitable for executing a workload analyzing program, in accordance with at least one embodiment of the present invention.

FIG. 3 is a block diagram depicting components of a computer 300 suitable for executing the workload analyzing program 150. FIG. 3 displays the computer 300, the one or more processor(s) 304 (including one or more computer processors), the communications fabric 302, the memory 306, the RAM 316, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g., microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for the workload analyzing program 150 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. The workload analyzing program 150 may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    identifying a storage migration, said storage migration being associated with a storage area network, said storage migration having a storage migration rate associated therewith;
    identifying an input/output throughput rate for said storage area network;
    identifying a service level agreement rate for said input/output throughput rate;
    identifying a non-essential workload, said non-essential workload storing a non-essential workload rate associated therewith; and
    determining an analyzed rate based on said throughput rate, said service level agreement rate, and said non-essential workload rate.

2. The computer-implemented method of claim 1, further comprising:
    updating said storage migration rate based on said analyzed rate.

3. The computer-implemented method of claim 2, wherein updating said storage migration based on said analyzed rate includes updating a priority level associated with said storage migration.

4. The computer-implemented method of claim 2, wherein updating said storage migration based on said analyzed rate includes reducing said non-essential workload rate.

5. The computer-implemented method of claim 1, wherein analyzing said throughput rate, said service level agreement rate, and said non-essential workload rate to yield an analyzed rate is based on predictive analytics, the predictive analytics predicting how removing said non-essential workload from an input/output throughput associated with the input/output throughput rate will impact said storage migration rate.

6. The computer-implemented method of claim 1, wherein determining an analyzed rate based on said throughput rate, said service level agreement rate, and said non-essential workload rate includes generating an analytics profile, the analytics profile storing variables associated with previous rates.

7. The computer-implemented method of claim 6, further comprising:
   updating said storage migration rate based on said analyzed rate and said analytics profile.

8. A computer program product comprising:
   one or more computer readable storage media and program instructions stored on said one or more computer readable storage media, said program instructions comprising instructions to:
     identify a storage migration, said storage migration being associated with a storage area network, said storage migration having a storage migration rate associated therewith;
     identify an input/output throughput rate for said storage area network;
     identify a service level agreement rate for said input/output throughput rate;
     identify a non-essential workload, said non-essential workload storing a non-essential workload rate associated therewith; and
     determine an analyzed rate based on said throughput rate, said service level agreement rate, and said non-essential workload rate.

9. The computer program product of claim 8, further comprising program instructions, stored on said one or more computer readable storage media, to:
   update said storage migration rate based on said analyzed rate.

10. The computer program product of claim 9, wherein instructions to update said storage migration based on said analyzed rate includes instructions to update a priority level associated with said storage migration.

11. The computer program product of claim 9, wherein instructions to update said storage migration based on said analyzed rate includes instructions to reduce said non-essential workload rate.

12. The computer program product of claim 8, wherein instructions to analyze said throughput rate, said service level agreement rate, and said non-essential workload rate to yield an analyzed rate is based on predictive analytics, the predictive analytics predicting how removing said non-essential workload from an input/output throughput associated with the input/output throughput rate will impact said storage migration rate.

13. The computer program product of claim 8, wherein instructions to determine an analyzed rate based on said throughput rate, said service level agreement rate, and said non-essential workload rate includes instructions to generate an analytics profile, the analytics profile storing variables associated with previous rates.

14. The computer program product of claim 13, further comprising program instructions, stored on said one or more computer readable storage media, to:
   update said storage migration rate based on said analyzed rate and said analytics profile.

15. A computer system comprising:
   one or more computer processors;
   one or more computer readable storage media;
   computer program instructions; and
   said computer program instructions being stored on said computer readable storage media for execution by at least one of said one or more processors, said computer program instructions comprising instructions to:
     identify a storage migration rate associated therewith;
     identify an input/output throughput, said input/output throughput being associated with said storage area network, said input/output throughput storing a throughput rate for said storage area network;
     identify a service level agreement rate for said input/output throughput rate;
     identify a non-essential workload, said non-essential workload storing a non-essential workload rate associated therewith; and
     determine an analyzed rate based on said throughput rate, said service level agreement rate, and said non-essential workload rate.

16. The computer system of claim 15, further comprising program instructions, stored on said computer readable storage media for execution by at least one of said one or more processors, to:
   update said storage migration rate based on said analyzed rate.

17. The computer system of claim 16, wherein instructions to update said storage migration based on said analyzed rate includes instructions to update a priority level associated with said storage migration.

18. The computer system of claim 16, wherein instructions to update said storage migration based on said analyzed rate includes instructions to reduce said non-essential workload rate.

19. The computer system of claim 15, wherein instructions to analyze said throughput rate, said service level agreement rate, and said non-essential workload rate to yield an analyzed rate is based on predictive analytics, the predictive analytics predicting how removing said non-essential workload from an input/output throughput associated with the input/output throughput rate will impact said storage migration rate.

20. The computer system of claim 15, wherein instructions to determine an analyzed rate based on said throughput rate, said service level agreement rate, and said non-essential workload rate includes instructions to generate an analytics profile, the analytics profile storing variables associated with previous rates.

* * * * *